Figure 1:
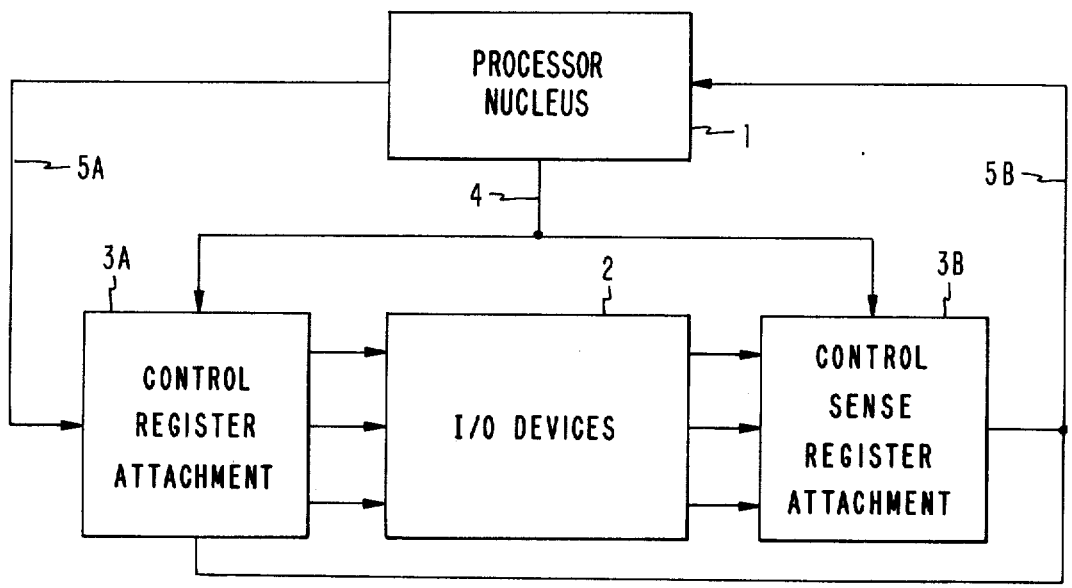

United States Patent [19]

Blum et al.

[11] 4,030,076

[45] June 14, 1977

[54] PROCESSOR NUCLEUS COMBINED WITH NUCLEUS TIME CONTROLLED EXTERNAL REGISTERS INTEGRATED WITH LOGIC AND ARITHMETIC CIRCUITS SHARED BETWEEN NUCLEUS AND I/O DEVICES

[75] Inventors: Arnold Blum, Pforzheim; Johann Hajdu, Boeblingen; Claus Erich Mohr, Munich; Leopold Reichl; Guenther Sonntag, both of Boeblingen, all of Germany

[73] Assignee: International Business Machines Corporation, Armonk, N.Y.

[22] Filed: July 16, 1975

[21] Appl. No.: 596,487

[30] Foreign Application Priority Data

Aug. 2, 1974 Germany .......................... 2437252

[52] U.S. Cl. ........................................... 340/172.5
[51] Int. Cl.² ..................... G06F 3/00; G06F 7/38; G06F 9/12
[58] Field of Search ...................... 340/172.5; 445/1

[56] References Cited
UNITED STATES PATENTS

| 3,254,330 | 5/1966 | Berger | 340/172.5 |
|---|---|---|---|
| 3,419,852 | 12/1968 | Marx et al. | 340/172.5 |
| 3,544,973 | 12/1970 | Borck, Jr. et al. | 340/172.5 |
| 3,573,741 | 4/1971 | Gavril | 340/172.5 |
| 3,596,256 | 7/1971 | Alpert et al. | 340/172.5 |
| 3,643,223 | 2/1972 | Ruth et al. | 340/172.5 |
| 3,681,761 | 8/1972 | Schuenemann et al. | 340/172.5 |
| 3,710,328 | 1/1973 | Hunter et al. | 340/172.5 |
| 3,805,245 | 4/1974 | Brooks et al. | 340/172.5 |
| 3,916,383 | 10/1975 | Malcolm | 340/172.5 |
| 3,936,803 | 2/1976 | Katzman et al. | 340/172.5 |
| R27,703 | 7/1973 | Stafford et al. | 340/172.5 |

Primary Examiner—Melvin B. Chapnick

[57] ABSTRACT

Input/output registers integrated with logic and arithmetic circuits are combined externally of a processor nucleus having only storage registers, instruction decode logic, timing circuitry and arithmetic and logic unit for executing microinstructions whereby the use of the input/output registers is determined by microprogram code and by time control to either selectively execute all adapter and interface communication and control functions for input and output devices or to selectively be switched into the data flow of the processor nucleus.

6 Claims, 4 Drawing Figures

PROCESSOR NUCLEUS COMBINED WITH NUCLEUS TIME CONTROLLED EXTERNAL REGISTERS INTEGRATED WITH LOGIC AND ARITHMETIC CIRCUITS SHARED BETWEEN NUCLEUS AND I/O DEVICES

BACKGROUND OF THE INVENTION

The invention relates to a data processing system with synchronous operation of a computer nucleus, arithmetic logic units, storages, and registers with peripherals.

Known data processing systems generally consist of an arithmetic logic unit, an instruction unit, an internal storage, and peripherals for the reading in and out of data and programs. In such systems, the central processing units are either directly coupled to the input and output devices and synchronized therewith, or connected via buffers and adaptors or interfaces. The adaptors or interfaces and the registers associated to the input and output devices have been included in order to free the central processing unit of the data processing system from time-consuming specific sub-microoperations for the connected input and output devices.

Furthermore, it is known to connect the input and output devices via channels controlling and performing the entire data communication between the central processing unit and the input and output devices. These principles are described in an article in Communications of the ACM, Vol 11, Number 6, June 1968, pp. 410 to 414. In this article it is also pointed out that by the addition of subroutines for the input and output devices, by adding supplementary registers and logic circuits, a channel of a data transmission system actually represents per se a processor which can control specific input and output devices. In modern data processing systems as e.g., in IBM 370/125 the various input and output devices have associated so-called input/output processors. These input/output processors are connected via a bus system, with respect to data as well as instruction, to further subprocessors for predetermined tasks within the data processing system. These processors are made in a large-scale integrated technology so that on the one hand efforts are made to obtain processors with layouts that are so identical as possible, and on the other to design the processors in such a manner that they will satisfy demands for each function to be employed within the data processing system. In order to be able to use multiple I/D control processors within a data processing system of that type of organization, a certain redundancy had to be accepted such that the technical complexity of an I/O control processor for some tasks within the data processing system was too great for price reasons.

In German Auslegeschrift 1.524.099, for a console processor co-acting with a display device, it is suggested in order to reduce the technical complexity to use the deflection registers of the display device during computer operation as accumulator and program address register.

Although it is shown here that external registers associated to the input and output devices can be included in the data flow of a processor in order to reduce the technical complexity, this solution has the disadvantage that this use of the registers for a predetermined purpose cnnot be controlled by the microprogram code and is very limited.

It is therefore the object of the present invention to provide an improvement over the above described prior art in that the use of the input output registers is determined by the micro-program code and by the time control, so that on the one hand all adaptor and interface communication and control functions for the input and output devices are performed by the registers, and that on the other these registers can be fully integrated into the data flow of a processor.

SUMMARY OF THE INVENTION

The advantage of the present solution consists in that in the processors themselves only minimum technical complexity is involved, and that furthermore by including the external registers in the data flow and in the instruction flow of the processor a very high efficiency of the processor can be reached. Furthermore, by combining the logic and arithmetic circuitry with the external registers associated with the input and output devices identical I/O control processors can be used to control various input and output devices. This structure shows on the one hand that the I/O control processors made in large-scale integrated technology can be very small and identical, that furthermore the masks for making the external registers integrated with logic circuits can be identical, and on the other hand, by combining the logic and arithmetic circuits with the external registers, a previously unattained flexibility in the connection and control means of input and output devices is achieved.

The invention will now be described on the basis of embodiments shown in the drawings. THe FIGURES represent the following:

FIG. 1 is a block diagram of a processor nucleus connected to external registers having locig integrated therewith and connected to I/O devices.

Figure 4:
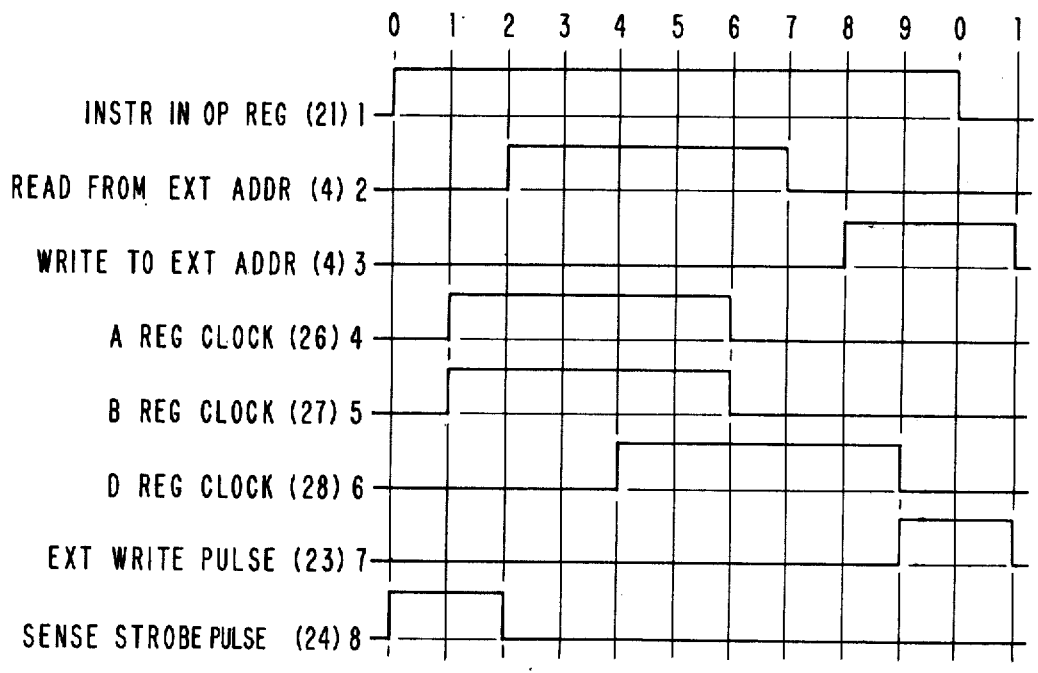
Figure 2:
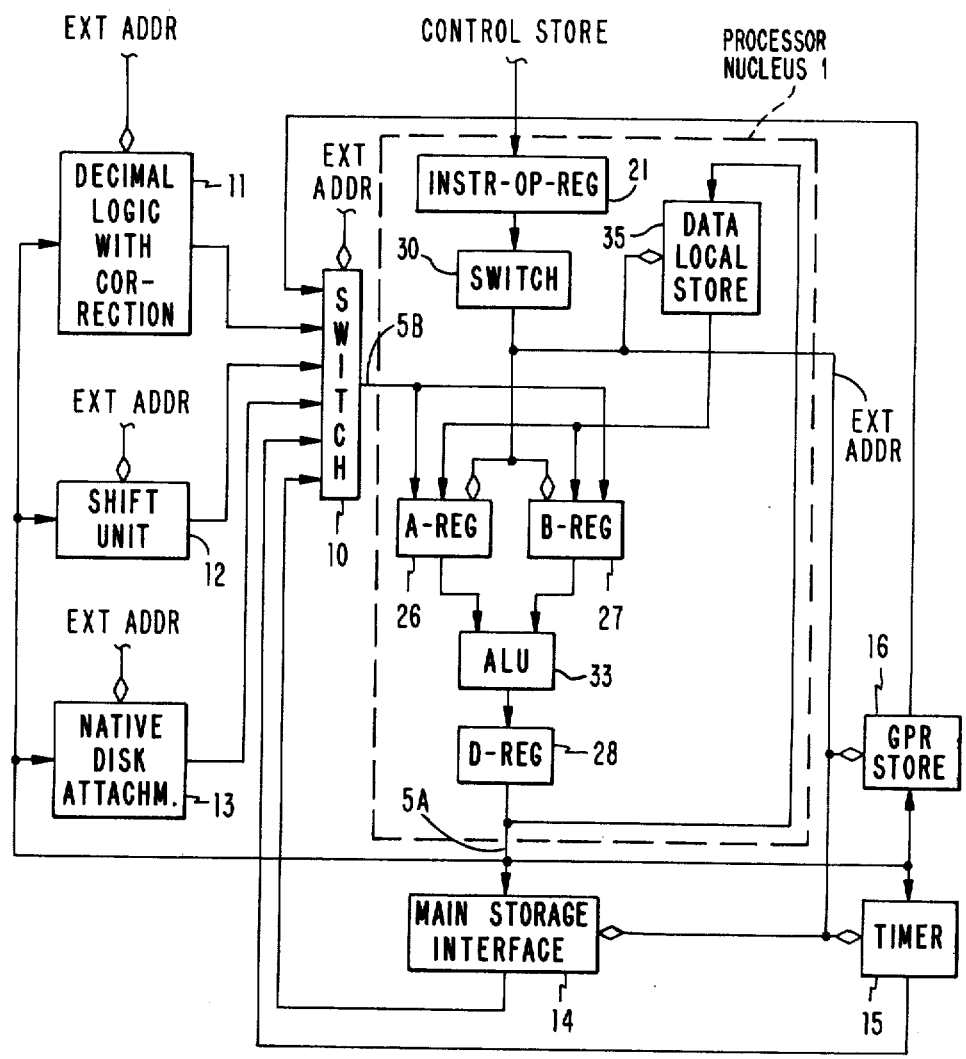
Figure 3:
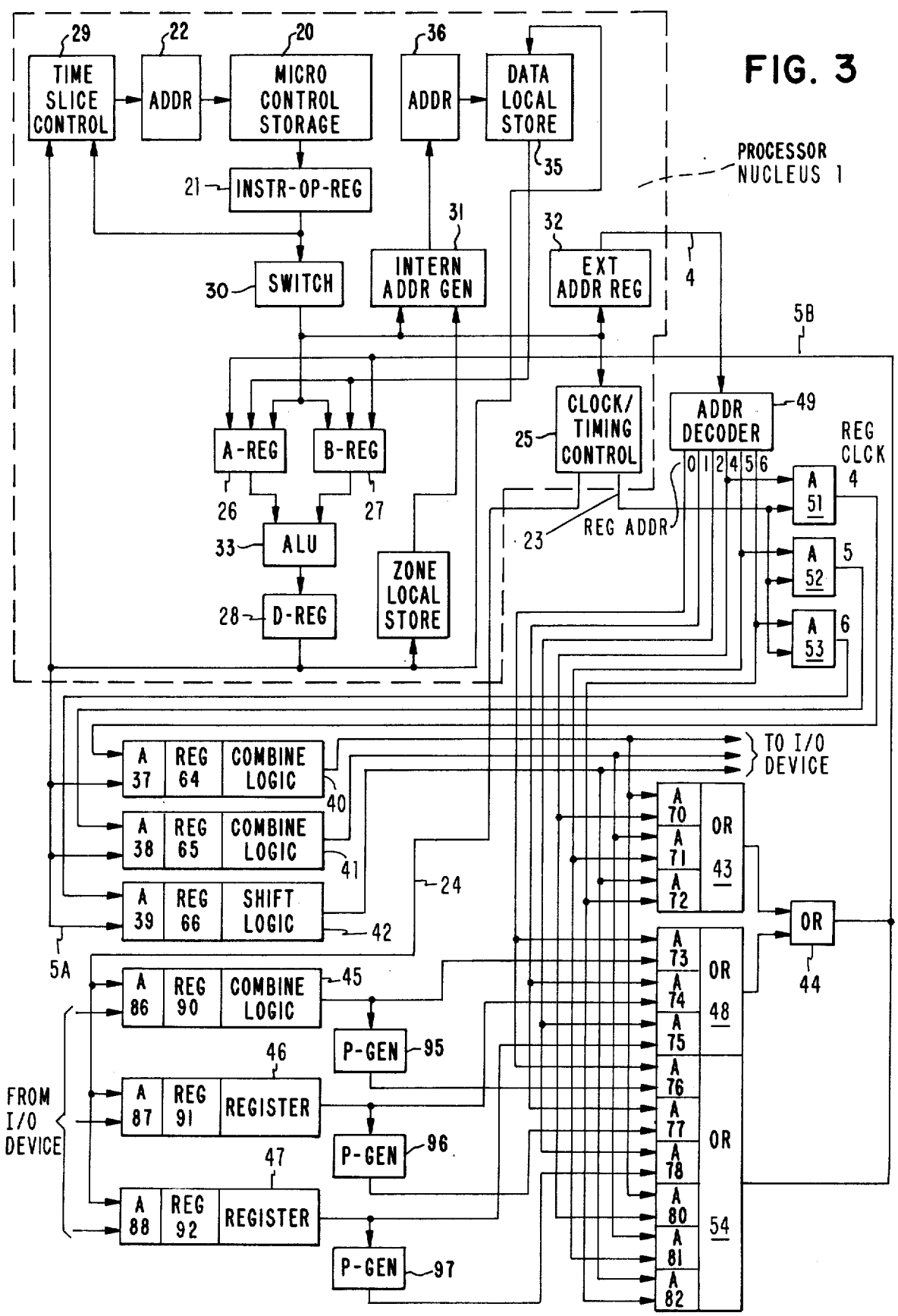

FIG. 2 a detailed circuit diagram of a processor nucleus with connected registers for input and output devices;

FIG. 3 another detailed circuit diagram showing in particular the connection of the external registers with integrated logic circuits to the processor nucleus, and FIG. 4 a time diagram explaining the operation of the circuit in accordance with FIG. 3. FIG. 1 is a block diagram showing the connections between a processor nucleus, and input and output devices 2 via registers with integrated logic circuit 3A and 3B. The registers with integrated logic circuit 3A and 3B are addressed and controlled by processor nucleus 1 via line 4 having several wires. The addresses select particular registers of registers with integrated logic circuitry 3A and 3B as well an the selected registers as input and output 7 devices 2 themselves are synchronized with processor nucleus 1. The data flow between processor nucleus 1 and I/O devices 2 via registers with integrated logic circuit 3A and 3B takes place via input and output lines 5A and 5B. Processor nucleus 1 has storage for data, address registers, an arithmetic logic unit for data and instruction processing or modification, respectively, and a time control which will be explained below in detail. The processor nucleus 1 has a micro-instruction storage which in cooperation with the time control supplies addresses and instructions. In the execution of the microinstructions, the external registers with integrated logic circuits modify the function of the microinstruction being executed in such a manner that the required operation for a specific use is realized. These specific operations can be for the connected required input and output devices 2 or they can be auxiliary processing functions for the processor nucleus. For example either the I/O devices 2 or the processor nucleus 1 may require a shift operation, or the I/O devices 2 may require decimal operation, or an arithmetic logic function. In other words, it is possible, with the structure shown by FIG. 1, that by loading 3A and 3B with information from or under control of the microinstruction the functions to be performed can be effected by the integrated logic of 3A and 3B which operates to modify the function of the microinstruction. The modified function can be to make circuit 3A and 3B a part of the data flow of processor nucleus 1, or that 3A and 3B control connected input and output devices 2, or that 3A and 3B establish the connection between the input and output devices 2 and processor nucleus 1.

FIG. 2 represents a more detailed circuit diagram representing both the internal structure of processor nucleus 1, and its utilization as problem-oriented processor.

Below it will be specified how processor nucleus 1 can be made into a problem-oriented processor.

Switch 10 selects the data which are directed from the registers with integrated logic circuit, e.g., from the decimal logic 11, shift unit 12, adaptor and control circuit 13 for a disk storage, the logic interface circuit 14 for the main storage, the additional storage 16, and timer 15, via a line 5B to processor nucleus 1. An address is applied to all registers with integrated logic circuit 11 to 15, and to additional storage 16 in order to select them. As already mentioned above, it is possible to modify this address in one or more of the decimal logic 11, shift unit 12, adapter and control circuit 13 for a disk storage drive, a logic interface circuit 14 of the main storage, the additional storage 16, and timer 15, if necessary. The output of switch 10 is connected to processor nucleus 1 via input line 5B, and output line 5A of processor nucleus 1 is connected to decimal logic 11, shift unit 12, adpater and control circuit 13 for a disk storage drive, the logic interface circuit 14 for the main storage, the additional storage 16, and timer 15. The particular advantage of this structure is that the processor nucleus contains only a minimum of circuit structure. Owing to this principle, a modular adaptation is ensured so that it is possible to alter the system without any difficulties in accordance with the specific requirements the specific peripherals.

First, the structure of the circuit arrangement represented in FIG. 3 will be described, and its operation will be specified later in connection with the time diagram in accordance with FIG. 4.

In the upper left-hand part of FIG. 3, processor nucleus 1 includes microinstruction control storage 20 containing microinstructions stored at addressable locations. The microinstructions are fetched under control of address register 22 and entered into instruction operation register 21. The output of register 21 is directly applied to time slice control logic 29 and applied to registers 26 and 27, internal address generator 31, external address register 32 and clock/timing control 25 via switch 30. Registers 26 and 27 are connected to provide data, i.e., operands or addresses to arithmetic and logic unit (ALU) 33. ALU 33 performs conventional arithmetic and logic functions and its output is connected to register 28. Register 28 feeds time slice control 29, zone local store 34, data local store 35 and AND Ser. No. 596,487 circuits 37, 38, and 39.

Zone local store 34 provides address data to internal address generator 31 which also receives address data from register 21. The output of address generator 31 is applied to address register 36 for addressing data local store 35. The output of data local store 35 is fed to inputs of registers 26 and 27. Via output line 5A, processor nucleus 1 is connected to registers 64, 65 and 66 with integrated logic circuits 40 to 42 which correspond to register with integrated logic 3A of FIG. 1. The outputs of the registers 64, 65 and 66 with integrated logic circuits 40 to 42 serve to control the connected input and output devices 2 of FIG. 1. The data from register 28 is entered into registers 64, 65 and 66 under control of AND circuits 37, 38 and 39. These AND circuits are conditioned by the outputs of AND circuits 51, 52 and 53 respectively. AND circuits 51, 52 and 53 are connected to output lines of address decoder 49 and are conditioned by a timing signal from clock/timing control 25 via line 23. Address decoder 49 decodes addresses residing in register 32 which are supplied via line 4. Hence, an address from register 21 which is furnished to register 32 can Ser. No. 5960487 control entry of data into registers 64, 65 and 66.

Although the outputs of integrated logic circuitry 40, 41 and 42 are applied to I/O devices 2, they are also applied to AND circuits 70, 71, 72, 80, 81 and 82. AND circuits 70, 71 and 72 are conditioned by outputs of address decoder 49 and feed OR circuit 43. OR circuit 43 feeds OR circuit 44 and its output feeds register 26 and 27 of processor nucleus 1. AND circuits 80, 81 and 82 are also conditioned by outputs of decoder 49 and they feed OR circuit 54 whose output is dot or connected to the output of OR circuit 44. The externally arranged registers 64, 65 and 66 with integrated logic circuits 40 to 42 thus act as if they were part of processor nucleus 1 and consequently increase the function of processor nucleus 1. Below, by means of the timing diagram of FIG. 4 the operation of the circuit arrangment shown in FIG. 3 will be described.

The timing diagram of FIG. 4 presents in the horizontal the time axis showing a microinstruction cycle of processor nucleus 1. A microinstruction cycle is divided into ten sub-cycles. On the vertical axis some for the invention highly essential control signals are shown. In row 1 the microinstruction 21 which at that time is in the operation register and which is valid for the mircoinstruction cycle shown, is represented. Row 2 shows in what time a read process of the registers with integrated logic can be performed. In row 3 the write signal is given, i.e., this is the time in which a register with integrated logic circuit can be written from the processor nucleus 1. Both sub-cycles relate to the processor nucleus address on line 4, said address coming from processor nucleus 1. In other words, the address signal supplied by processor nucleus 1 on line 4 is differently interpreted at different sub-cycles of the microinstruction cycle; in the present case, row 2 indicates a read operation, and row 3 indicates a write operation. Rows 4, 5, and 6 show clock signals associated to registers 26, 27, and 28. Which of the inputs of registers 26 and 27, as shown in processor nucleus 1 will be selected depends on the microninstruction to be performed. Row 7 shows the write pulse fo the registers with integrated logic circuit 64, 65 and 66. The reason for extending the writing by one sub-cycle over the actual mircoinstruction is that in the modular structure of the processor nucleus organized in accordance with this invention longer lines are provided which cause a delay of the signals. In row 8, a pulse is shown which scans the information made available by an I/O device. This pulse appears in each micro-instruction cycle and is independent of the applied addresses and microinstructions. As processor nucleus 1, as shown in row 2, can already process the information in the registers to sub-cycle 2 the pulse for scanning the information on row 8 of the timing diagram to sub-cycle 2 of the mirco-instruction cycle is terminated.

This time and clock control, as given in the timing diagram of FIG. 4, shows that the registers 64, 65, and 66 with integrated logic circuits 40 to 42 and registers 90, 91, and 92 integrated with combine logic 45 and registers 46 and 47 respectively, receive data from I/O devices 2 via AND circuits 86, 87 and 88. These AND circuits are conditioned by a timing signal fed over line 24 from clock/timing control 25. Registers 90, 91 and 92 together with combine logic 45 and registers 46 and 47 correspond to the elements of block 3B in FIG. 1. The outputs of combine logic 45 and registers 46 and 47 feed AND circuits 73, 74 and 75 and parity generator circuits 95, 96 and 97 respectively. Parity generator circuits 95, 96 and 97 feed AND circuits 76, 77 and 78 respectively. AND circuits 73, 74 and 75 feed OR circuit 48 which in turn feeds OR circuit 44. It will be recalled that the output of OR circuit 44 feeds registers 26 and 27. AND circuits 76, 77 and 78 feed OR circuit 54 and its output as previously described is dot OR connected with the output of OR circuit 44 as a function of the address applied and the mircroinstruction applied, can execute, at a predetermined sub-cycle within the microinstruction cycle, their arithmetic or logic function as it is determined thereby. It is thus possible to cause the registers associated to the external devices to execute arithmetic or logic functions by means of the microinstructions loaded by the processor nucleus 1, and to use them as part of the processor nucleus, or as an attachment between the processor nucleus and the peripherals, or as control and adaptor or interface circuit for any units of the computer system.

What is claimed is:

1. In a stored program data processing system including a processor nucleus and input/output (I/O) devices, said processor nucleus including control storage containing microinstructions and data, said microinstructions having control bits and address bits, a microinstruction register connected to receive microinstructions from said control storage, microinstruction fetch means for accessing said control storage and transferring a selected microinstruction to said microinstruction register, a data local store, addressing means for addressing said data local store, internal address generation means selectively connectable by said control bits to receive said address bits from a microinstruction in said microinstruction register and connected to provide addresses to said addressing means, first and second operand registers having inputs from said data local store, from said microinstruction register and from sources external to said processor nucleus, an arithmetic and logic unit (ALU) connected to said operand registers, a data register connected to receive data from said ALU, clock timing control means connected to be controlled by said control bits and operable to provide timing control signals, the improvement comprising:

external address register means selectively connectable under control of said control bits to receive said address bits from said mircoinstruction, external registers having logic means integral therewith to perform logical operations on data entered into said external registers for either said processor nucleus or said I/O devices, means connecting said logic means integral with said external registers to said I/O devices, first gating means connected to control entry of data into said external registers, said first gating means connected to receive data from said data register under control of said external address register means and said clock timing control means, said data entered into said external registers including control data for said logic means integral with said external registers, and second gating means connected to said logic means integral with said external registers to receive output data therefrom and pass said output data to said operand registers in said processor nucleus, said second gating means being connected under control of said external address register means and said clock timing control means.

2. The data processing system of claim 1 wherein said logic means integral with said external registers includes a shift unit, said shift unit being selectable and operable under control of microinstructions executed by said processor nucleus to function as a shift unit.

3. The data processing system of claim 1 wherein said logic means integral with said external registers includes an arithmetic logic unit selectable under control of microinstructions executed by said processor nucleus for performing arithmetic operations for said input/output devices.

4. The data processing system of claim 1 further comprising:

other external registers having logic means integral therewith to perform logical operations on data entered into said other external registers, third gating means connected to control entry of data into said other external registers, said third gating means being connected to receive data from said I/O devices and connected to be controlled by said clock timing control means, and fourth gating means connected to receive output data from said logic means integral with said other external registers and pass said output data to said operand registers under control of said external register address means and said clock timing control means.

5. The computer system of claim 1 wherein said data register is loaded with control data from said data local store.

6. The computer system of claim 1 wherein said data register is loaded with control data from a microinstruction in said microinstruction register.

* * * * *